United States Patent [19]
Delnick et al.

[11] Patent Number: 5,426,006
[45] Date of Patent: Jun. 20, 1995

[54] STRUCTURAL MICRO-POROUS CARBON ANODE FOR RECHARGEABLE LITHIUM-ION BATTERIES

[75] Inventors: Frank M. Delnick, Albuquerque, N. Mex.; William R. Even, Jr., Livermore, Calif.; Alan P. Sylwester, Washington, D.C.; James C. F. Wang, Livermore; Thomas Zifer, Manteca, both of Calif.

[73] Assignee: Sandia Corporation, Albuquerque, N. Mex.

[21] Appl. No.: 49,696

[22] Filed: Apr. 16, 1993

[51] Int. Cl.$^6$ ............................................. H01M 4/58
[52] U.S. Cl. ................................. 429/218; 423/445 R; 252/182.1
[58] Field of Search ................ 429/218; 423/445; 252/182.1

[56] References Cited

U.S. PATENT DOCUMENTS

| | | | |
|---|---|---|---|
| 3,960,770 | 6/1976 | Raley et al. | 423/445 X |
| 4,304,825 | 12/1981 | Basu | 429/103 |
| 4,423,125 | 12/1983 | Basu | 429/194 |
| 4,522,953 | 6/1985 | Barby et al. | 521/64 |
| 4,536,521 | 8/1985 | Haq | 521/146 |
| 4,611,014 | 9/1986 | Jomes et al. | 521/146 |
| 4,668,595 | 5/1987 | Yoshino et al. | 429/194 |
| 4,702,977 | 10/1987 | Hiratsuka et al. | 429/194 |
| 4,749,514 | 6/1988 | Murakami et al. | 252/500 |
| 4,775,655 | 10/1988 | Edwards et al. | 423/445 X |
| 4,832,881 | 5/1989 | Arnold, Jr. et al. | 264/29.7 |
| 4,863,814 | 9/1989 | Mohri et al. | 429/60 |
| 4,863,818 | 9/1989 | Yoshimoto et al. | 429/218 |
| 4,945,014 | 7/1990 | Miyabayashi et al. | 429/218 |
| 4,959,281 | 9/1990 | Nishi et al. | 429/194 |
| 4,968,527 | 11/1990 | Yoshimoto et al. | 427/122 |
| 4,978,649 | 12/1990 | Surovikin et al. | 423/445 X |
| 4,980,250 | 12/1990 | Takahashi et al. | 429/194 |
| 5,021,462 | 6/1991 | Elmes et al. | 521/63 |
| 5,028,500 | 7/1991 | Fong et al. | 429/94 |
| 5,208,003 | 5/1993 | Simandl et al. | 423/445 |
| 5,232,772 | 8/1993 | Kong | 423/445 X |
| 5,260,855 | 11/1993 | Kaschmitter et al. | 361/502 |

FOREIGN PATENT DOCUMENTS

| | | |
|---|---|---|
| 220216 | 8/1989 | Japan . |
| 1294372 | 4/1991 | Japan . |

*Primary Examiner*—Stephen Kalafut
*Attorney, Agent, or Firm*—Bruce M. Winchell; Gregory A. Cone; Kurt C. Olsen

[57] ABSTRACT

A secondary battery having a rechargeable lithium-containing anode, a cathode and a separator positioned between the cathode and anode with an organic electrolyte solution absorbed therein is provided. The anode comprises three-dimensional microporous carbon structures synthesized from polymeric high internal phase emulsions or materials derived from this emulsion source, i.e., granules, powders, etc.

35 Claims, 6 Drawing Sheets

STRUCTURAL MICRO-POROUS CARBON ANODE FOR RECHARGEABLE LITHIUM-ION BATTERIES

The United States Government has rights in this invention under contract DE-AC0A-76DP00789 between the U.S. Department of Energy and American Telephone and Telegraph Company.

FIELD OF THE INVENTION

This invention relates to non-aqueous secondary batteries and more particularly to rechargeable lithium-ion batteries employing rechargeable carbon anodes made from polymeric foam precursors which are reversibly intercalated with lithium.

BACKGROUND OF THE INVENTION

Secondary or rechargeable batteries are used in a variety of applications, but the secondary battery market is coming under increased attack by environmental concerns. Indeed, the principal consumer rechargeable battery, the nickel-cadmium battery, has limited future utility because of growing governmental regulatory pressures. Current alkali metal batteries have not been used extensively as secondary batteries because of their limited cycle life.

Conventional secondary, non-aqueous lithium cells typically include an anode of metallic lithium, a lithium electrolyte prepared from a lithium salt dissolved in one or more organic solvents, and a cathode of an electrochemically active material, typically a chalcogenide or oxide of a transition metal. During discharge, lithium ions from the anode pass through the liquid electrolyte to the electrochemically active material of the cathode where the ions are taken up with the simultaneous release of electrical energy. During charging, however, the flow of ions is reversed so that lithium ions pass from the electrochemically active cathode material through the electrolyte and are plated back onto the lithium anode. During each discharge/charge cycle small amounts of lithium and electrolyte are consumed by chemical reactions at newly created surfaces. As lithium inherently tends to form high surface area peaks or dendrites as it is plated back onto the anode, this reactive condition is aggravated. Furthermore, the dendritic peaks continue to grow until they eventually contact the cathode which causes the cell to fail before the useful lifetime is realized.

In an attempt to solve these problems, carbonaceous material as lithium intercalation anodes in secondary lithium-ion batteries have been introduced. Yoshiro et al., U.S. Pat. No. 4,668,595, issued May 26, 1987; Basu, U.S. Pat. No. 4,423,125, issued Dec. 27, 1983; and Basu, U.S. Pat. No. 4,304,825, issued Dec. 8, 1981. Carbon anodes have been synthesized from various organic compounds by vapor phase pyrolysis. In this process molecules are vaporized in flowing argon or nitrogen and then pyrolyzed onto an anode substrate. Benzene is a preferred organic precursor and some benzene derived anodes have exhibited up to approximately 86% lithium utilization efficiency ($Li_{0.86}C_6$) through approximately 100 cycles. Mohri et al., U.S. Pat. No. 4,863,814, issued Sep. 5, 1989; Yoshimoto et al., U.S. Pat. No. 4,863,818, issued Sep. 5, 1989; and Yoshimoto et al., U.S. Pat. No. 4,968,527, issued Nov. 6, 1990. Carbonaceous anodes can also be formed by condensed phase pyrolysis of individual organic compounds, including polyacrylonitrile (PAN). Hiratsuka et al., U.S. Pat. No. 4,702,977, issued Oct. 27, 1987. Alternatively, the carbonaceous materials can be blended with powdered metals that alloy with lithium. Miyabayashi et al., U.S. Pat. No. 4,945,014, issued Jul. 31, 1990. See also Murakami et al., U.S. Pat. No. 4,749,514, issued Jun. 7, 1988 (pyrolysis of thin films of poly(phenylene oxadiazole) and Nishi et al., U.S. Pat. No. 4,959,281, issued Sep. 25, 1990 (carbon anodes produced by pyrolysis of selected furan resins). Anodes having a laminate structure consisting of a carbon molded article, made of carbon fiber or carbon powder, with lithium absorbed therein before being inserted into the secondary battery have also been used. Takahashi et al., U.S. Pat. No. 4,980,250, issued Dec. 25, 1990. Finally, carbonaceous anodes consisting of a multi-phase composition that includes (1) a highly graphitic carbon, (2) a substantially non-graphitic carbon, and (3) an electrically conductive filamentary material, such as carbon black, have been introduced. Fong, U.S. Pat. No. 5,028,500, issued Jul. 2, 1991.

Some of these prior art methods which endeavored to control electrode porosity did not produce quality electrodes because they invariably used binders, adhesives, or thermal plastics to convert carbon powders into porous sheets or plates. The use of these materials frequently actually degrades the utilization efficiency of the carbon electrodes and reduces the electrical conductivity of the electrodes, the latter phenomenon being caused by the particle-to-particle resistive contacts in such bonded composites.

Thus, despite some improvements in alkali secondary batteries, there remains a need for rechargeable batteries that are inexpensive, stable, easy to manufacture, and that have extended rechargeable lifetimes.

SUMMARY OF THE INVENTION

It is a primary object of the present invention to provide a rechargeable, long-life negative electrode for a lithium-ion secondary battery which demonstrates minimal dendritic deposition, high energy density, long charged-discharged cycle life, light weight, and high reliability.

These and other objects are accomplished with the inventive rechargeable electrode which comprises three-dimensional porous carbon structures having a network of cells separated from each other by walls and interconnected by holes through said walls. The cells have diameters in the range of approximately 1.0 to 100 $\mu m$. In addition, the carbon structures have a macroscopic density of less than approximately 1.0 g/cc and the carbon structures have randomly oriented domains shown by transmission electron microscopy to contain approximately 4 to 10 lattice planes extending approximately 20 to 50 Å in lateral extent. In one preferred embodiment of the carbon structures which were formed at a carbonization temperature of 1100° C. the X-ray diffraction spectrum of the carbon structures shows large $d_{002}$ lattice spacing in the order of 3.7 to 3.8 Å and Raman spectrum shows substantial peak areas at 1360 $cm^{-1}$ (disordered peak) and at 1580 $cm^{-1}$ (ordered peak). The ratio of the peak strengths was nearly equal in magnitude. The rechargeable electrode is uniquely suited for use as the anode in lithium-ion secondary batteries.

The electrode is fabricated from emulsion derived precursor foams made from (1) a carbon forming monomer and/or polymer, (2) a surface active agent that stabilizes the immiscible phase, and (3) a temporary pore former. The immiscible systems may be (1) two organic liquids or (2) one organic and one inorganic liquid with the carbon former and the temporary pore former existing in opposite phases. The carbon source can exist in either the organic or the inorganic liquid. A variety of carbon structures can be produced by using different monomers and/or polymers. One preferred system uses methacrylonitrile and divinylbenzene as the organic monomer/carbon former and water as the pore former.

DESCRIPTION OF THE PREFERRED EMBODIMENTS

Figure 1:
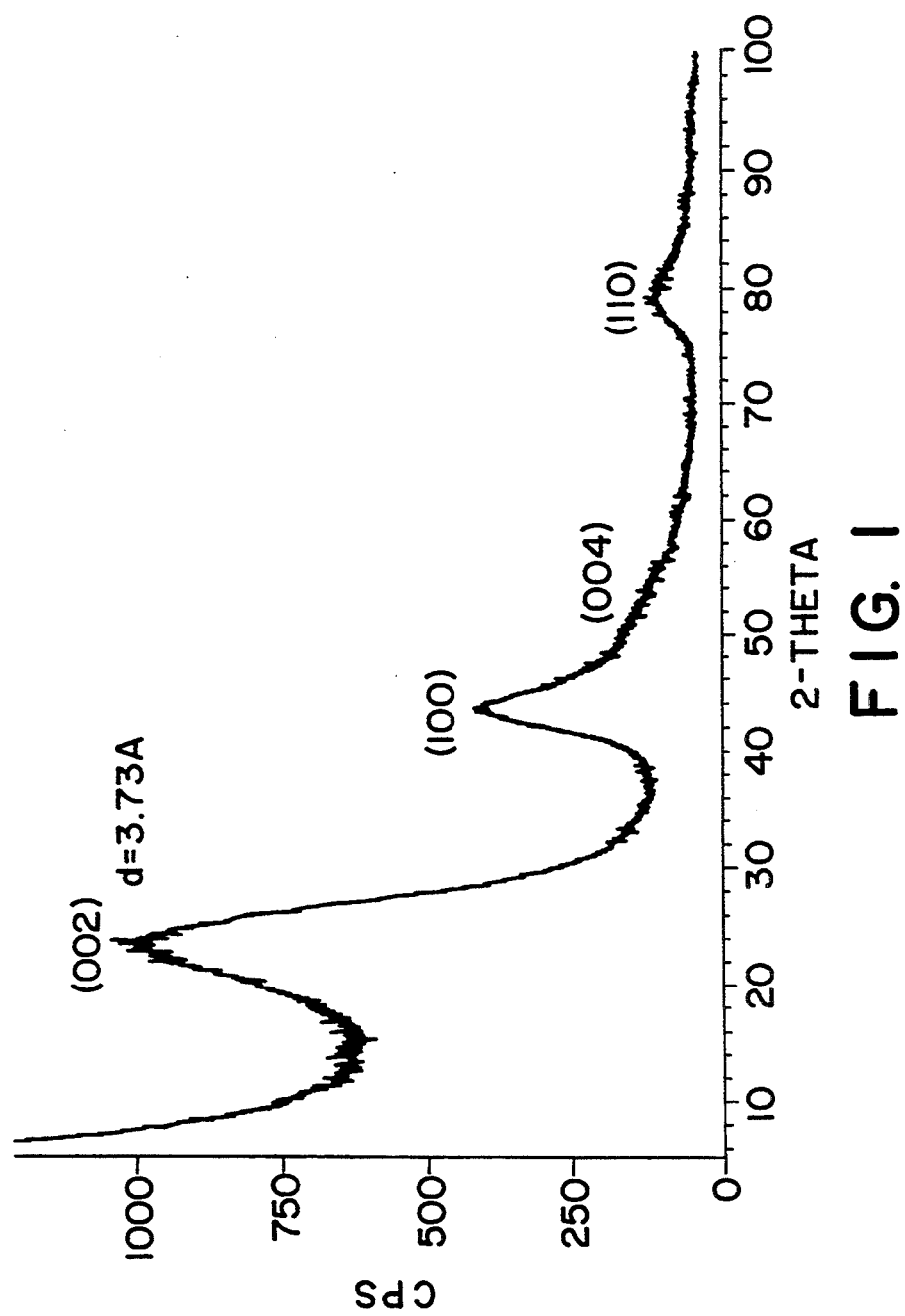
FIG. 1 is an X-ray diffraction spectrum of a microporous carbon structure.

The present invention is based in part on the discovery that certain carbons typically produced as microporous carbon structures are uniquely suited for use as electrodes in alkali metal intercalation-type rechargeable batteries. The microporous carbon structures are synthesized from emulsion derived precursor foams made from (1) a carbon forming monomer and/or polymer, (2) a surface active agent that stabilizes the immiscible phase, and (3) a temporary pore former. The immiscible systems may be (1) two organic liquids or (2) one organic and one inorganic liquid with the carbon former and the temporary pore former existing in opposite phases. The carbon source can exist in either the organic or the inorganic liquid. A variety of carbon structures can be produced by using different monomers and/or polymers. One preferred system uses methacrylonitrile and divinylbenzene as the organic monomer/carbon former and water as the pore former.

The process for fabricating the inventive microporous carbon structures represents an improvement and extension of existing methods for synthesizing porous materials from polymeric high internal phase emulsions. These prior art techniques are described in Haq, U.S. Pat. No. 4,536,521, issued Aug. 20, 1985, and Elmes et al, U.S. Pat. No. 5,021,462, issued Jun. 4, 1991, both of which are incorporated herein, and the technology is referred to by the trade name "Polyhipe" ®, (available from Unilever, PLC, United Kingdom). Elmes '462, for instance, describes a method of forming a three dimensional porous polymeric material by first preparing an emulsion having a continuous phase containing polymerizable precursor materials and an internal phase consisting of globules having a wide range of dimensions covering the range 0.5 to 100 $\mu$m, and then forming the polymeric material in the continuous phase by polymerization and cross-linking. Finally, the internal phase is removed. Hitherto, the porous materials fabricated by these techniques have been used as absorbents and related applications.

Improvements in the polymer precursor foam fabrication processes include, for instance, modifications in mixing and emulsion refining techniques which resulted in significant reduction of foam cell size and uniformity. In addition, improve emulsion stabilizing techniques allows for the production of foams over a wider density range. Furthermore, using modifiers and changing chemical formulation and processing conditions also influenced the foam structure and surface area. Finally, it was found that the nature of the carbon former and the characteristics of the resulting precursor foam play critical roles in establishing the random, microcrystalline nature of the carbon intercalation electrode.

PREPARATION OF MICROPOROUS CARBON

The following illustrates the procedure for preparing the inventive microporous carbon structures. For inverse emulsions, one or more chain extending species, such as methacrylonitrile, and one or more cross-linking species, such as divinylbenzene (DVB), are mixed as co-monomers with sorbitan monooleate to form the continuous oil phase of the emulsion. Water with a radical initiator is used as the temporary pore forming phase. The character of the emulsion can be appropriately tailored with the use of co-solvents, solutes, and modifying salts for varying ionic strengths.

Both the oil phase and the water phase can be chilled to enhance the stability of the resulting emulsion and reduce the resulting pore size. Moreover, the vessel containing the continuous phase can be evacuated to reduce entrapped air. The pore forming phase is added as small aliquots to form the emulsion seed. Once a stable emulsion is formed larger aliquots are used. The total volume of the pore forming phase added largely determines the resulting foam density, so that as more pore former is added, a lower density product is produced.

The monomer/pore former, i.e. oil phase, and water phase can be mixed by various methods depending on physical properties of the emulsion or on the final foam specification. Highly viscous emulsions can be successfully mixed in eccentric spinning mixers which use the container as the mixing vessel and process its entire contents. When very small and uniform cell size is required, mixing methods which involve refining of the emulsion via impact on the container ends are preferred. Such motion is typical of small ball mills intended for grinding.

Emulsion stability is normally enhanced by reduced temperatures and depending on the monomer, emulsions can be "stored" for up to 24 hours without major coarsening of the emulsion. In those cases where the polymerization is thermally initiated, the cure is governed by the heat capacity and dimensions of the intended foam part and mold assembly. When the cure is catalyzed by a secondary constituent, it can be added either at the initiation of emulsification or near the end of the process. The stage at which the catalyst is added may depend on the specific activity of the catalytic events and/or process parameters (e.g., continuous or batch process).

After polymerization, which generally should take place between approximately 25°–85° C., the emulsion solidifies into a rigid structural mass. The temperature range at which polymerization of the methacrylonitrile and divinylbenzene was investigated was 45°–70°. Once the foam is cured and removed from the mold, the foam is preferably dried, i.e. removal of the temporary pore former, before further processing. Drying of the foam appears to be the most effective method for breaking the surfactant membrane between adjacent cells to provide the open cell nature. After the open cell nature of the foam has been established, the material is easily washed free of residual salts and catalyst products. This can be accomplished by conventional extraction methods, including: forced flow-through washing, soxhlet extraction, or supercritical carbon dioxide extraction. The cleaning method used depends on the particular foam type, its composition, cell size, surface tension, and other physical properties, and on the particular application. For some applications where the soluble species are not present, the surfactant may be simply removed during pyrolysis at the time of carbonization. When water is used as the pore former, a standard forced air oven can be used for drying. In the case of an oil phase pore former, its removal must be in accordance with applicable environmental regulations. In many instances this involves trapping and re-use or proper disposal of the oil phase pore former. The materials can be machined at any point once the foam is cured, but it is usually easier to machine pre-forms or grind powders from the cleaned polymer.

After removal of the solvent, carbonization of the polymer product can be accomplished by various schemes, both with and without thermal pre-treatment required by standard polyacrylonitrile processing, see U.S. Pat. No. 4,832,881, issued May 23, 1989, which is incorporated here. Superior results are observed with pretreatment of the polymethacrylonitrile/divinylbenzene system. One pretreatment procedure includes subjecting the product to hot air (200°–300° C.) at various ramp rates and soak times. Carbonization can be achieved by heating the product with an inert gas that is flowing at approximately 1–2 liters per minute, and at ramp rates of 0.5°0–2° C. per minute. Carbonization routinely includes thermal soaks at below 500° C. to stabilize the structure and to facilitate the desorption of adsorbates. Initial carbonization can include heating the product up to approximately 800°–1100° C. Optionally, further carbonization at higher temperatures at approximately 1200°–2000° C. can be employed. Normally, carbonization at higher temperature results in more ordered carbon structures. Battery anode performance does not necessarily increase with higher carbonization temperatures.

Cooling rates should generally not exceed 5° C. per minute in order to minimize thermally induced stresses for large parts. But in the case of powder processing, the rates may be considerably higher. Because of the large volumetric change which occurs on carbonization, specimen constraint may be necessary in order to maintain regular shapes if so desired. On rectilinear pieces, flat graphite plates can serve the restraint function. On irregular pieces, graphite rods or beads will serve the same function.

Through the careful extraction of the noncarbon forming species and the drying, thermal stabilization, and carbonization of the foam precursor, as described above, a carbon foam structure is produced that can be used as an efficient intercalation electrode. Moreover, by controlling selected process conditions, it is possible to produce/design carbon products that represent a virtual continuum in structure, that is from amorphous to semi-crystalline. Furthermore, the presence of cross-linking species (e.g. DVB) produces elaborate and intractable networks within the polymer foam precursor. A highly cross-linked system contributes to a substantial molecular free volume in the polymer foam which is believed to also manifest itself in the final carbon product.

The resulting carbon foam is "microcrystalline" with randomly oriented domains that contain 4–10 lattice planes extending only 20–50 angstroms in lateral extent as evidenced by transmission electron microscopy (TEM). The carbon foam typically has a macroscopic density of equal to or less than approximately 1.0 g/cc. An adjustable volume fraction of less ordered carbon exists between the boundaries of the microcrystalline domains. This less ordered material is of lower density and thus contains a great deal of free volume. Although neither crystalline nor graphitic in nature, it is believed that these less ordered areas play an important role for alkali metal intercalation. It was found that the effectiveness of the carbon as an intercalation electrode does not increase with elevated carbonization temperature (i.e. with increased graphitic content), but rather appears to be optimal at an intermediate temperature in the vicinity of approximately 1000°–1200° C. Although, measurable electrochemical activity is observed at temperatures as low as 900° C.

Microporous carbon structures were synthesized from a system using methacrylonitrile and divinylbenzene as the organic monomer/carbon former and water as the pore former wherein the carbonization temperature was approximately 1100° C. Electron micrograph of the microstructure and lattice planes evidenced small crystalline domains having 4–10 lattice planes extending 20 to 50 Å in lateral extent, as described above. Moreover, referring to FIG. 1, the X-ray diffraction spectrum of this carbon structure shows very broad $d_{002}$ lattice spacing in the order of 3.7 to 3.8 Å.

Figure 2:
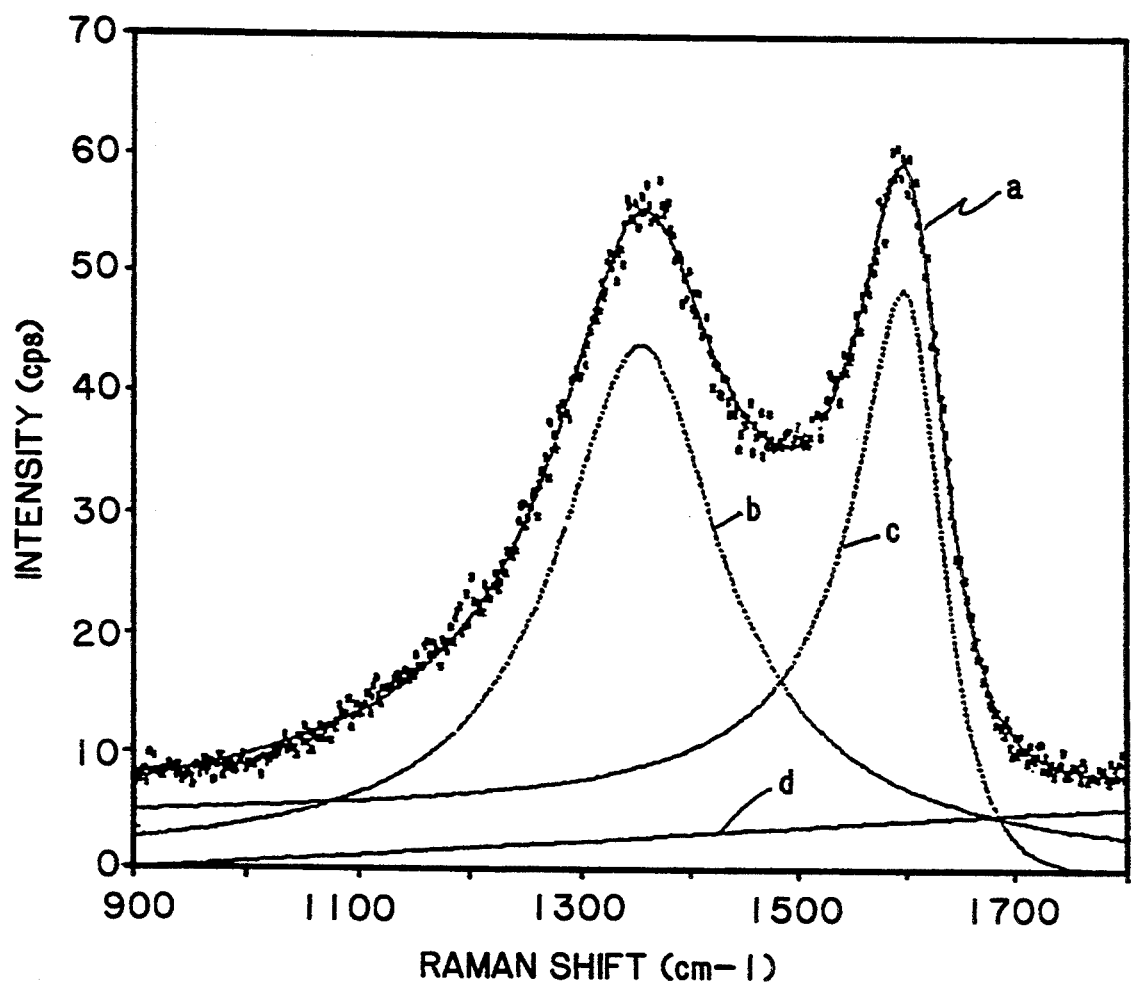
FIG. 2 is a Raman spectrum of a microporous carbon structure.

FIG. 2 is a deconvoluted Raman spectrum of the microporous carbon structure showing substantial peak area at 1360 cm$^{-1}$ (disordered peak) as well as substantial peak area at 1580 cm$^{-1}$ (ordered peak). As shown, the ratio of the peak strengths (ordered v. disordered phase) is slightly less than 1; however, it is expected that in other embodiments of the microporous carbon structures, the ratio can be equal to or greater than 1. The Raman spectrum (that is, curve a) is generated by a least square method from actual data. Curves b and c are Lorentzian curves used to fit the data and curve d is the base line.

It should be noted that porosity is established in the emulsion process prior to carbonization. Where used as a cast or machined structure, the carbon foam is a contiguously bonded monolithic structure of high electrical conductivity. No binders, adhesives, or thermal plastics are required. Electrical conductivity is not limited by particle-to-particle contact. Binders, adhesives, and thermal plastics may, however, be used to enhance mechanical characteristics or when powder processing is desirable. As is apparent, electrodes can be manufactured from the carbon foam or structure in any suitable configuration including monolithic structures, granules, and powders.

Appropriate crosslinking of the emulsified polymer appears to prevent surface preferential alignment of the polymer backbone (and subsequent orientation of carbon basal plane) parallel to the solid/liquid interface. Therefore, the carbonized polymer maintains a random surface orientation of the carbon crystallites up to and including the surface. The random orientation permits ready access of lithium ions to the carbon galleries during intercalation.

Electrochemical Evaluation

Figure 3:
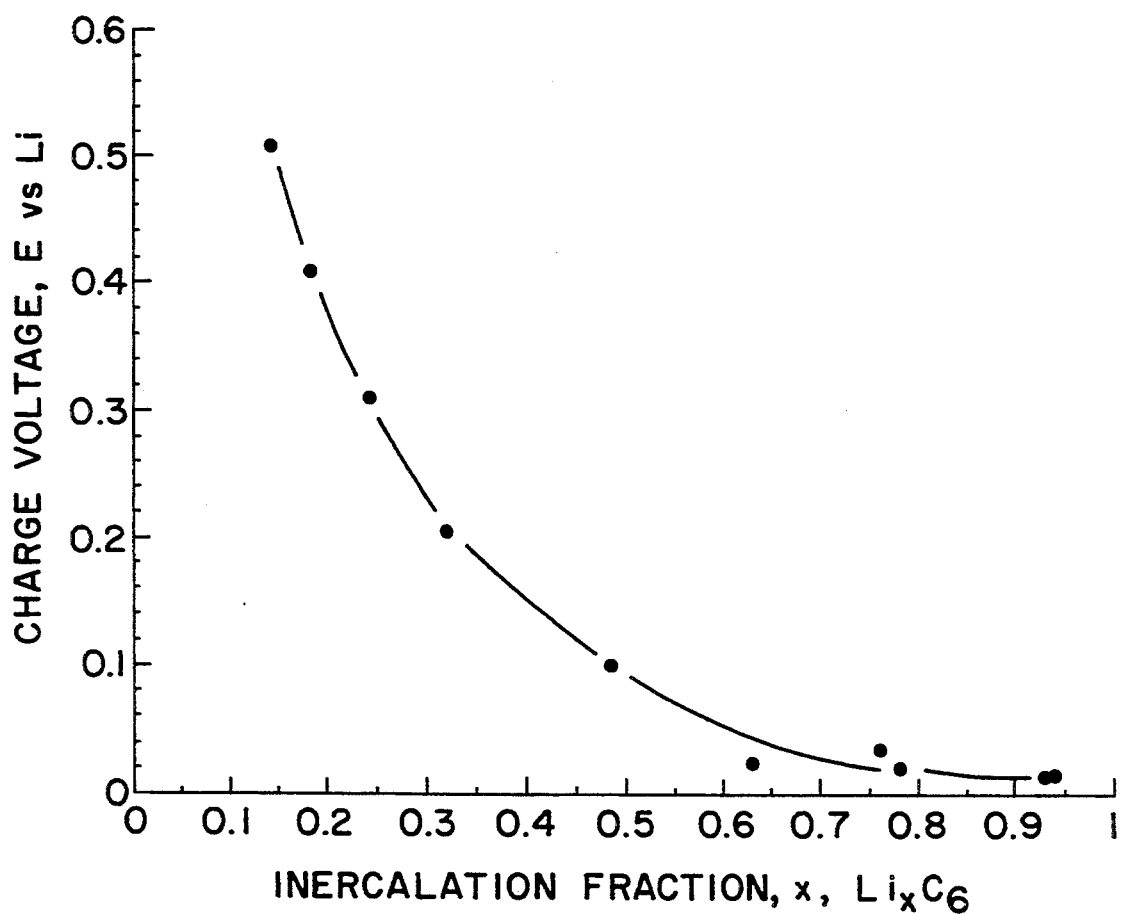
FIG. 3 presents the lithium intercalation fraction as a function of potential.

Electrodes made from the inventive carbon foams were then tested for intercalation activity in a half-cell testing arrangement. The monolithic carbon blocks were machined into discs 1.0 cm in diameter and 0.1 cm thick. Each carbon disc was enclosed in a nickel screen and submerged in a 1.0M $LiAsF_6$ solution with propylene carbonate as the solvent. Each carbon working electrode was polarized using a lithium metal auxiliary electrode. Potentials were controlled and measured versus a second lithium metal reference electrode. The potential dependent lithium intercalation efficiency was measured for each carbon by potentiostatically charging it at selected potentials in the range 0.6 V to 0.01 V versus lithium. After each charge the electrode was discharged potentiostatically at 1.5 V versus the lithium reference. Integration of the discharge current yielded the coulombic lithium intercalation efficiency at the corresponding charging potential. These measurements were made after electrochemical formatting and irreversible passivation of the carbon surface. The lithium intercalation efficiency is presented as a function of potential in FIG. 3.

Figure 4:
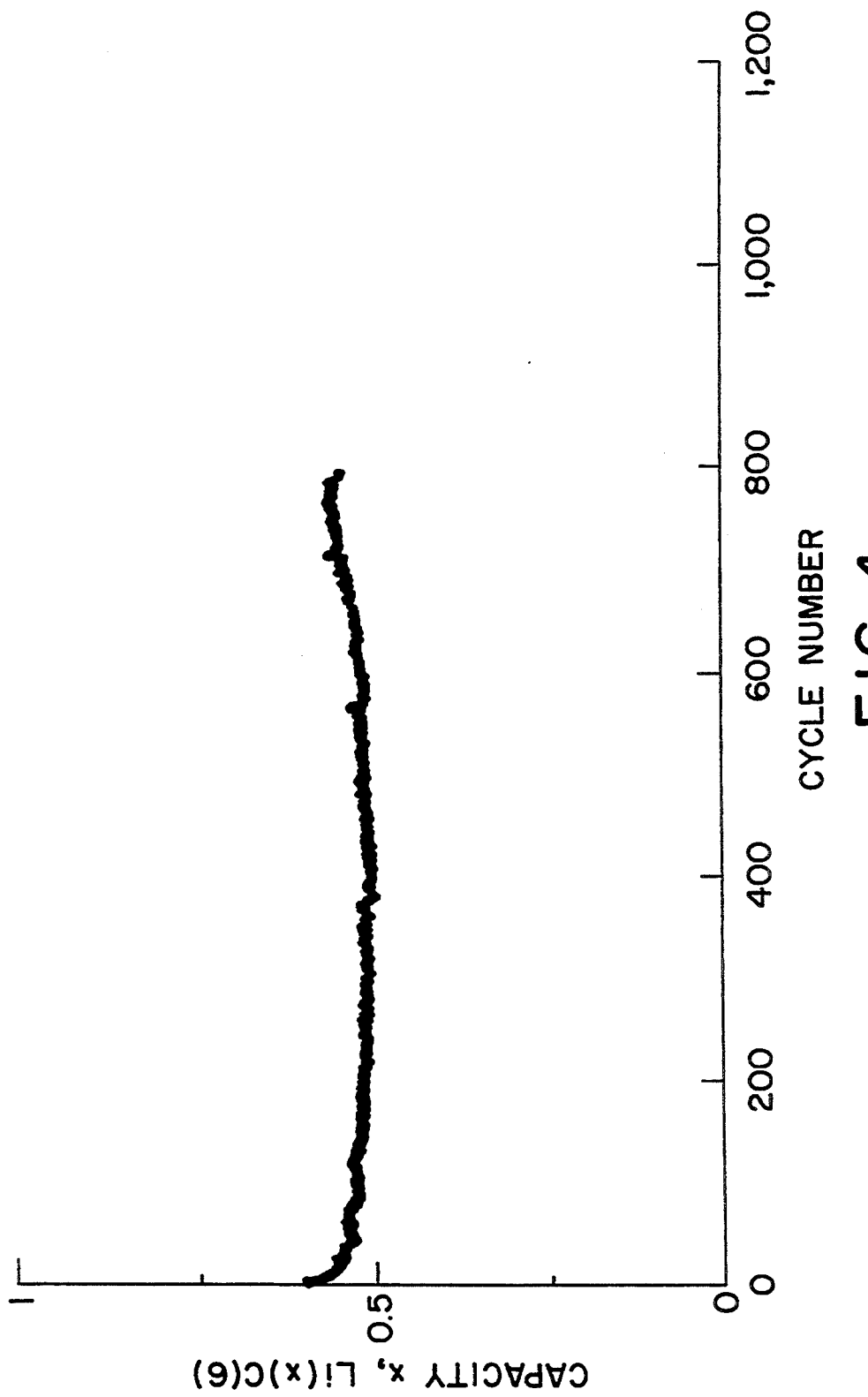
FIGS. 4 and 5 present the discharge capacities as a function of cycle number for carbon foam electrodes which were charged to two different intercalation fractions.
Figure 5:
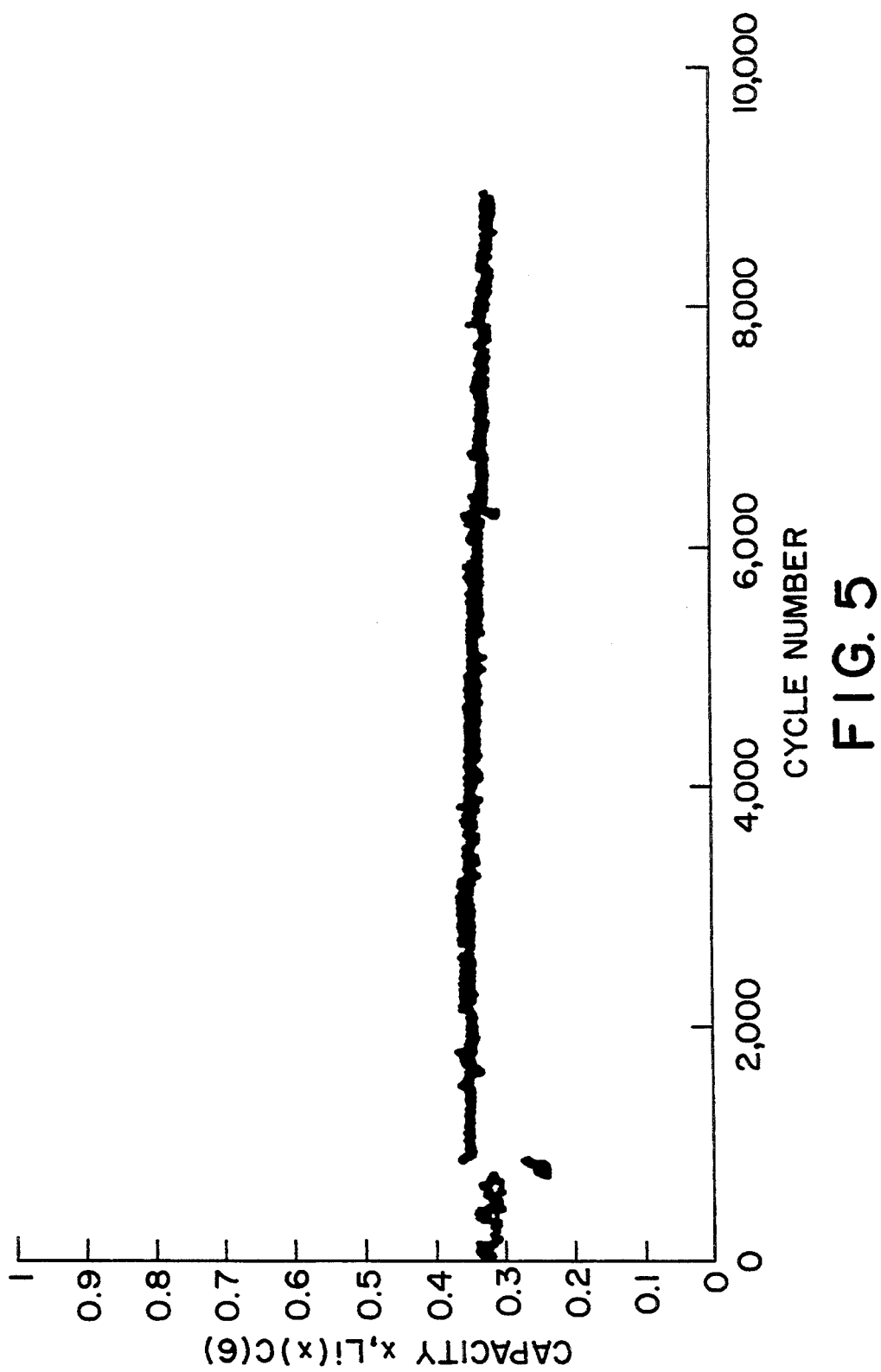

To evaluate the cycle ability of the carbon foam electrodes, a $Li_xC_6/Li^+/Li_{(1-x)}C_6$ concentration cell was prepared as follows. Two carbon discs were enclosed in nickel screens and submerged in a 1.0M $LiAsF_6$ solution with propylene carbonate as the solvent. A lithium metal flag and a lithium metal reference electrode were also submerged in the electrolytic solution. The lithium metal flag electrode was used to format and passivate both carbon electrodes. Then the lithium flag electrode was used to charge one of the carbon electrodes (C1) to $LiC_6$. This electrode (C1) was then used to charge the other carbon electrode (C2) to $Li_xC_6$. The current was then reversed and C2 was used to recharge C1. This procedure was repeated and after each cycle, the stoichiometric capacity, x, of C2 was determined from the integration of its discharge current. The discharge capacity as a function of cycle number for two carbon foam electrodes tested are shown in FIGS. 4 and 5. In FIG. 4, a carbon electrode is cycled by charging for four hours and discharging for four hours at 0.36 mA. Another carbon electrode is cycled by charging for 40 minutes and discharging at 2 mA. Both electrodes continue to cycle without degradation. The data in FIGS. 4 and 5 confirm the excellent cycle ability of these inventive carbon anodes. Although lithium intercalation efficiency and cycle ability was measured in 1.0M $LiAsF_6$-propylene carbonate electrolyte, other electrolytes consisting of salts shown in Table 1 dissolved in a solvent (or mixture of solvents) shown in Table 2 could also have been used.

TABLE 1

Illustrative Supporting Electrolyte Salts for Secondary Lithium-Ion Batteries

| | | |
|---|---|---|
| $LiClO_4$ | $LiBF_4$ | $LiCF_3SO_3$ |
| $LiAsF_6$ | $LiAlCl_4$ | LiI |
| $LiPF_6$ | $LiB(C_6H_5)_4$ | LiBr |
| | | $LiN(CF_3SO_2)_2$ |

TABLE 2

Illustrative Solvents for Secondary Lithium-Ion Batteries

| | |
|---|---|
| propylene carbonate | 4-methyl-2-pentanone |
| ethylene carbonate | 1,2 dichloroethane |
| vinylene carbonate | dimethyl thioformamide |
| diethyl carbonate | sulfolane |
| dimethoxyethane (monoglyme) | trimethyl phosphate |
| diglyme | triethyl phosphate |
| triglyme | dimethylformamide (DMF) |
| methyl formate | dimethysulfoxide (DMSO) |
| γ-butyrolactone | tetrahydrofuran (THF) |
| acetonitrile | 2-methyl THF |
| proprionitrile | 1,4 dioxane |
| butyronitrile | anisol |
| benzonitrile | |

Figure 6:
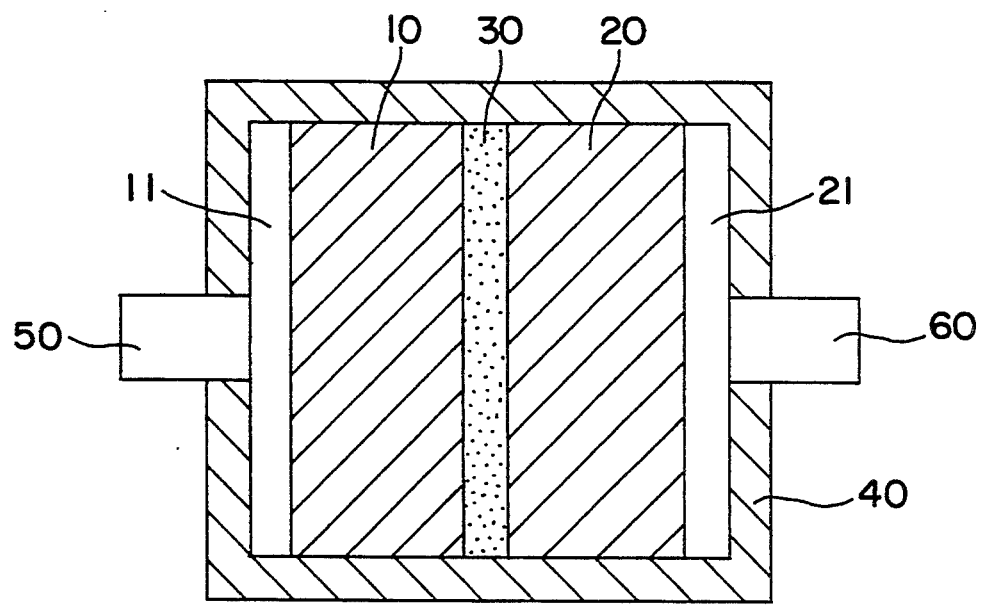
FIG. 6 is a secondary battery with a lithium intercalated anode.

FIG. 6 is a cross-sectional view of a nonaqueous secondary battery constructed with the inventive microporous carbon anode 10 having lithium intercalated therein. The cathode 20 may be fabricated from a variety of rechargeable materials, including, but not limited to, metal oxides, chalcogenides of transition metals, or conjugated polymers. Preferred cathode materials include lithiated manganese oxides ($Li_xMnO_2$, $Li_xMn_2O_4$), lithiated cobalt oxide ($Li_xCoO_2$), lithiated vanadium oxides ($Li_xV_2O_5$, $Li_xV_6O_{13}$), lithiated nickel oxide ($Li_xNiO_2$), and sulfides of iron, cobalt, molybdenum, and titanium ($FeS_2$, $CoS_2$, $MoS_2$, and $TiS_2$).

The lithium salt used for the electrolyte solution may be any one including those in Table 1. Usually, one kind of lithium salts is used, but two or more kinds may be used in mixture. The lithium salt is dissolved in the solvent (see Table 2) to provide the electrolyte solution of the secondary battery. One solvent or a mixture of these organic solvents may be used. The concentration of the lithium salt in the solution is usually 0.5 to 1.5 mol/l and preferably 1.0 to 1.5 mol/l.

The electrolyte solution containing lithium salt is usually impregnated into a separator 30 that is positioned between the electrodes to ionically connect them. The thickness of the separator should be sufficient to prevent an internal short circuit between the anode and the cathode.

The secondary battery in the present invention may include current collectors as in conventional batteries. For example, metals such as nickel, copper, aluminum, or stainless steel may be used as the cathode current collector 21; and nickel, copper, or stainless steel may be used as the anode current collector 11. The anode, cathode, and separator (including the electrolyte) are housed in a casing 40 that is made of insulative material. Terminals 50 and 60 are attached to the anode and cathode current collectors, respectively. The terminals are made of metal such as nickel, copper, aluminum, or stainless steel.

When a load is connected to the anode and the cathode, a discharge current begins to flow through the battery and the load. It is hypothesized that $Li^+$ ions are freed from the microporous carbon in the anode and are conducted by the electrolyte across the separator to the cathode. The ions then react with the cathode. Once all the lithium in the anode has been conducted to the cathode or the cathode has reached its maximum capacity of lithium, the battery reaches the end of its discharge life. It is recharged by reversing the current flow within the battery. It is believed that the $Li^+$ ion is then released from the cathode and conducted back to the anode where it is reintroduced to form lithium intercalated carbon.

It is to be understood that while the invention has been described above in conjunction with preferred specific embodiments, the description and examples are intended to illustrate and not limit the scope of the invention, which is defined by the scope of the appended claims.

It is claimed:

1. A secondary battery comprising:
   a positive electrode capable of reversibly incorporating a lithium atom;
   a rechargeable lithium atom-containing negative electrode comprising of three-dimensional porous, carbon structures having a network of cells separated from each other by walls and interconnected by holes through said walls, wherein the cells have diameters in the range of approximately 1 to 100 $\mu$m, wherein the carbon structures have a macroscopic density of less than 1.0 g/cc; and
   a non-aqueous electrolyte solution connecting said positive electrode and negative electrode.

2. The secondary battery as defined in claim 1 wherein the carbon structures have randomly oriented domains shown by transmission electron microscopy to contain approximately 4 to 10 lattice planes extending approximately 20 to 50 Å in lateral extent.

3. The rechargeable electrode as defined in claim 2 wherein the carbon structures have a spacing of (002) planes ($d_{002}$) as determined by X-ray diffraction of 3.7 Å or more, and wherein the carbon structures have the ratio of the peak strength at 1,360 cm$^{-1}$ to the peak strength at 1,580 cm of a deconvoluted Raman spectrum of approximately 1.

4. The secondary battery as defined in claim 3 wherein the positive electrode comprises of second three-dimensional porous carbon structures having a network of cells separated from each other by walls and interconnected by holes through said walls, wherein the cells have diameters in the range of approximately 1 to 100 $\mu$m, wherein the carbon structures have a macroscopic density of less than 1.0 g/cc.

5. The secondary battery as defined in claim 4 wherein the carbon structures of said positive electrode has randomly oriented domains shown by transmission electron microscopy to contain approximately 4 to 10 lattice planes extending approximately 20 to 50 Å in lateral extent.

6. The rechargeable electrode as defined in claim 5 wherein the carbon structures have a spacing of (002) planes ($d_{002}$) as determined by X-ray diffraction of 3.7 Å or more, and wherein the carbon structures have the ratio of the peak strength at 1,360 cm$^{-1}$ to the peak strength at 1,580 cm$^{-1}$ of a deconvoluted Raman spectrum of approximately 1.

7. The secondary battery as defined in claim 3 wherein the positive electrode comprises a sulfide compound.

8. The secondary battery as defined in claim 7 wherein the sulfide compound is selected from the group consisting of iron sulfide, cobalt sulfide, molybdenum sulfide, and titanium sulfide.

9. The secondary battery as defined in claim 8 wherein the positive electrode comprises a lithiated metal oxide.

10. The secondary battery as defined in claim 9 wherein the metal oxide is selected from the group consisting of lithiated vanadium oxides lithiated manganese oxide, and lithiated nickel oxide.

11. A method of preparing three dimensional microporous carbon structures suitable for energy storage applications wherein the carbon structures have a network of cells separated from each other by walls and interconnected by holes through said walls, wherein the cells have diameters in the range of approximately 1 to 100 $\mu$m, wherein the carbon structures have a macroscopic density of less than approximately 1.0 g/cc, that conaprises the steps of:
    mixing a first liquid that comprises a solvent, dissolved therein, polymerizable precursor materials and a surfactant and a second liquid that comprises a temporary pore former to form an emulsion, wherein the first liquid forms a continuous phase and the second liquid forms an internal phase in the emulsion;
    causing polymerization of the polymerizable precursor materials in the continuous phase such that a cellular polymeric material is formed;
    removing the solvent, surfactant and internal phase from said cellular polymeric material; and
    carbonizing said cellular polymeric material to form said three dimensional microporous carbon structures.

12. The method of preparing three dimensional microporous carbon structures as defined in claim 11 wherein the carbon structures have randomly oriented domains shown by transmission electron microscopy to contain approximately 4 to 10 lattice planes extending approximately 20 to 50 Å in lateral extent.

13. The method of preparing three dimensional microporous carbon structures as defined in claim 12 wherein the carbon structures have a spacing of (002) planes ($d_{002}$) as determined by X-ray diffraction of 3.7 Å or more, and wherein the carbon structures have the ratio of the peak strength at 1,360 cm$^{-1}$ to the peak strength at 1,580 cm$^{-1}$ of a deconvoluted Raman spectrum of approximately 1.

14. The method of preparing three dimensional microporous carbon structures as defined in claim 12 wherein the polymerizable precursor materials comprise one or more chain extending species and one or more cross-linking species.

15. The method of preparing three dimensional microporous carbon structures as defined in claim 14 wherein the polymerizable precursor materials comprise divinylbenzene and methacrylonitrile.

16. The method of preparing three dimensional microporous carbon structures as defined in either claim 14 or 15 wherein the temporary pore former comprises water.

17. The method of preparing three dimensional microporous carbon structures as defined in claim 16 further comprising the step of cooling the emulsion to stabilize it.

18. The method of preparing three-dimensional microporous carbon structures as defined in claim 11 further comprising the step of adding a surface active agent to stabilize the continuous phase.

19. The method of preparing three-dimensional microporous carbon structures as defined in claim 16 further comprising the step of adding co-solvents, solutes, or modifying salts into said emulsion.

20. A rechargeable electrode suitable for use in secondary batteries prepared by a process comprising the steps of:
    mixing a first liquid that comprises a solvent, dissolved therein, polymerizable precursor materials and a surfactant and a second liquid that comprises a temporary pore former to form an emulsion, wherein the first liquid forms a continuous phase and the second liquid forms an internal phase in the emulsion:

causing polymerization of the polymerizable precursor materials in the continuous phase such that a cellular polymeric material is formed;

removing the solvent, surfactant and internal phase from said cellular polymeric material; and carbonizing said cellular polymeric material to form said three dimensional structures.

21. The rechargeable electrode as defined in claim 20 wherein the carbon structures have randomly oriented domains shown by transmission electron microscopy to contain approximately 4 to 10 lattice planes extending approximately 20 to 50 Å in lateral extent.

22. The rechargeable electrode as defined in claim 21 wherein the carbon structures have a spacing of (002) planes ($d_{002}$) as determined by X-ray diffraction of 3.7 Å or more, and wherein the carbon structures have the ratio of the peak strength at 1,360 cm$^{-1}$ to the peak strength at 1,580 cm$^{-1}$ of a deconvoluted Raman spectrum of approximately 1.

23. The rechargeable electrode as defined in claim 21 wherein the polymerizable precursor materials comprise one or more chain extending species and one or more cross-linking species.

24. The rechargeable electrode as defined in claim 23 wherein the polymerizable precursor materials comprise divinylbenzene and methacrylonitrile.

25. The rechargeable electrode as defined in either claim 23 or 24 wherein the temporary pore former comprises water.

26. The rechargeable electrode as defined in claim 25 wherein the process of preparing the rechargeable electrode further comprises the step of cooling the emulsion to stabilize it.

27. The rechargeable electrode as defined in claim 20 wherein the process of preparing the rechargeable electrode further comprises adding co-solvents, solutes, or modifying salts into said emulsion.

28. The rechargeable electrode as defined in claim 25 wherein the process of preparing the rechargeable electrode further comprises adding co-solvents, solutes, or modifying salts into said emulsion.

29. An energy storage device having an electrode comprising three dimensional microporous carbon structures wherein the carbon structures have a network of cells separated from each other by walls and interconnected by holes through said walls, wherein the cells have diameters in the range of approximately 1 to 100 μm, wherein the carbon structures have a macroscopic density of less than approximately 1.0 g/cc, and wherein the rechargeable electrode is prepared by a process comprising the steps of:

mixing a first liquid that comprises a solvent, dissolved therein, polymerizable precursor materials and a surfactant and a second liquid that comprises a temporary pore former to form an emulsion, wherein the first liquid forms a continuous phase and the second liquid forms an internal phase in the emulsion;

causing polymerization of the polymerizable precursor materials in the continuous phase such that a cellular polymeric material is formed;

removing the solvent, surfactant and internal phase from said cellular polymeric material; and carbonizing said cellular polymeric material to form said three dimensional microporous carbon structures.

30. The energy storage device as defined in claim 29 wherein the carbon structures have randomly oriented domains shown by transmission electron microscopy to contain approximately 4 to 10 lattice planes extending approximately 20 to 50 Å in lateral extent.

31. The energy storage device as in claim 30 wherein the carbon structures have a spacing of (002) planes ($d_{002}$) as determined by X-ray diffraction of 3.7 Å or more, and wherein the carbon structures have the ratio of the peak strength at 1,360 cm$^{-1}$ to the peak strength at 1,580 cm$^{-1}$ of a deconvoluted Raman spectrum of approximately 1.

32. The energy storage device as in claim 31 wherein the polymerizable precursor materials comprise one or more chain extending species and one or more cross-linking species.

33. The energy storage device as in claim 32 wherein the polymerizable precursor materials comprise divinylbenzene and methacrylonitrile.

34. The energy storage device as in claim 32 or 33 wherein the temporary pore former comprises water.

35. The energy storage device as in claim 34 wherein the process of preparing the three dimensional microporous carbon structures further comprises the step of cooling the emulsion to stabilize it.

* * * * *